(12) United States Patent
Rosian et al.

(10) Patent No.: US 12,527,426 B2
(45) Date of Patent: Jan. 20, 2026

(54) SOUS VIDE APPLIANCE

(71) Applicant: Breville Pty Limited, Alexandria (AU)

(72) Inventors: Marian Silviu Rosian, Alexandria (AU); William Shen, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 1006 days.

(21) Appl. No.: 17/621,272

(22) PCT Filed: Jun. 25, 2020

(86) PCT No.: PCT/AU2020/050642
§ 371 (c)(1),
(2) Date: Dec. 21, 2021

(87) PCT Pub. No.: WO2020/257854
PCT Pub. Date: Dec. 30, 2020

(65) Prior Publication Data
US 2022/0354294 A1  Nov. 10, 2022

(30) Foreign Application Priority Data
Jun. 25, 2019 (AU) ................................ 2019902213

(51) Int. Cl.
A47J 27/10  (2006.01)
A47J 27/00  (2006.01)

(52) U.S. Cl.
CPC ............. A47J 27/10 (2013.01); A47J 27/004 (2013.01)

(58) Field of Classification Search
CPC ................................ A47J 27/10; A47J 27/004
See application file for complete search history.

(56) References Cited

U.S. PATENT DOCUMENTS 3,822,083 A * 7/1974 Zeamer .................... A45C 5/03
312/208.4
3,822,967 A * 7/1974 Cade ................... F04D 29/5893
417/372

(Continued)

FOREIGN PATENT DOCUMENTS

| CN | 207071034 U | 3/2018 |
| CN | 108064138 A | 5/2018 |

(Continued)

OTHER PUBLICATIONS

International Search Report for application No. PCT/AU2020/050642 dated Aug. 26, 2020.

(Continued)

Primary Examiner — Sean M Michalski
(74) Attorney, Agent, or Firm — KDW FIRM PLLC

(57) ABSTRACT

A device including a housing (12) sealingly enclosing an interior space (14), the housing including (12) a screen (20) having an internal surface (11) subject to air pressure in the interior space (14). Electronic components (22) disposed in the interior space and connected to the screen (20) to operate the device. A power cord (13) having one end terminating within the internal space (14) and another end connectable to an external power source. The power cord (13) has metallic conductors, and at least one air path to vent the interior space (14) to ambient air pressure.

18 Claims, 7 Drawing Sheets

(56) References Cited

U.S. PATENT DOCUMENTS

| | | | | |
|---|---|---|---|---|
| 3,869,265 | A * | 3/1975 | Wolter | A47L 9/0009 15/327.2 |
| 4,197,791 | A * | 4/1980 | Vieceli | A47J 37/0864 D7/354 |
| 4,451,693 | A * | 5/1984 | Vest | H05K 5/15 336/107 |
| 4,609,248 | A * | 9/1986 | Haase | H02G 11/02 439/449 |
| 4,881,320 | A * | 11/1989 | Kohle | H05K 3/34 29/841 |
| 4,918,290 | A * | 4/1990 | DeMars | F26B 9/003 219/400 |
| 5,064,967 | A * | 11/1991 | Singbartl | H02G 3/065 439/456 |
| 5,519,587 | A * | 5/1996 | Baggio | F21L 14/00 362/267 |
| 5,595,504 | A * | 1/1997 | Muller | H01R 13/5216 439/936 |
| 5,603,892 | A * | 2/1997 | Grilletto | H05K 7/20381 422/111 |
| 5,952,614 | A * | 9/1999 | Ries | H01B 12/08 174/128.1 |
| 6,089,143 | A * | 7/2000 | Figueroa | A47J 36/165 99/332 |
| 6,164,315 | A * | 12/2000 | Haslock | F04B 23/021 137/565.17 |
| 6,188,837 | B1 * | 2/2001 | Kwan | A45D 20/12 34/97 |
| 6,273,862 | B1 * | 8/2001 | Privitera | A61B 10/0275 600/568 |
| 6,314,648 | B1 * | 11/2001 | Hillebrandt | B26B 19/10 30/208 |
| 6,348,657 | B1 * | 2/2002 | Haslock | H02G 3/088 174/152 G |
| 6,452,138 | B1 * | 9/2002 | Kochman | H05B 3/58 219/549 |
| 6,791,825 | B1 * | 9/2004 | Taylor | G06F 1/1626 361/679.6 |
| 10,779,674 | B2 * | 9/2020 | Chan | A47J 27/004 |
| 2001/0047183 | A1 * | 11/2001 | Privitera | A61B 10/0266 606/170 |
| 2007/0221199 | A1 | 9/2007 | Hake | |
| 2008/0099227 | A1 * | 5/2008 | Zhang | H01B 7/328 174/113 R |
| 2009/0129940 | A1 * | 5/2009 | Stevens | F04D 15/0218 417/41 |
| 2011/0185915 | A1 * | 8/2011 | Eades | A47J 27/21058 99/331 |
| 2011/0288458 | A1 * | 11/2011 | Jones | A61H 9/0078 601/149 |
| 2013/0220143 | A1 * | 8/2013 | Fetterman | A47J 27/10 99/330 |
| 2013/0264333 | A1 * | 10/2013 | Alipour | A47J 36/321 219/621 |
| 2014/0035363 | A1 * | 2/2014 | Fleisig | H01R 13/665 307/11 |
| 2015/0253000 | A1 * | 9/2015 | Abernethy | F21L 14/02 362/249.06 |
| 2017/0231430 | A1 | 8/2017 | Moon | |
| 2018/0279805 | A1 * | 10/2018 | Galant | F16M 11/041 |
| 2019/0274463 | A1 * | 9/2019 | Chan | A47J 43/044 |
| 2020/0323381 | A1 * | 10/2020 | Messler | A47J 27/004 |
| 2022/0354294 | A1 * | 11/2022 | Rosian | H01B 3/445 |
| 2023/0269835 | A1 * | 8/2023 | Shen | H05B 3/46 219/523 |

FOREIGN PATENT DOCUMENTS

| | | |
|---|---|---|
| CN | 109315025 A | 2/2019 |
| CN | 109563998 A | 4/2019 |
| DE | 2051165 A1 | 5/1971 |
| KR | 20150069295 A | 6/2015 |
| KR | 101626414 B1 | 6/2016 |
| KR | 20170116759 A | 10/2017 |
| KR | 20170116762 A | 10/2017 |

OTHER PUBLICATIONS

Extended European Search Report and Written Opinion for Application No. 20832680 dated Jun. 19, 2023.

* cited by examiner

Figure 2: SECTION B-B

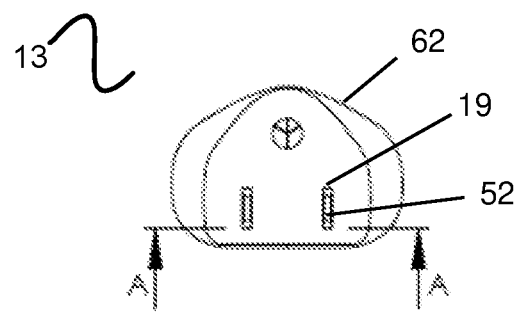
Figure 7
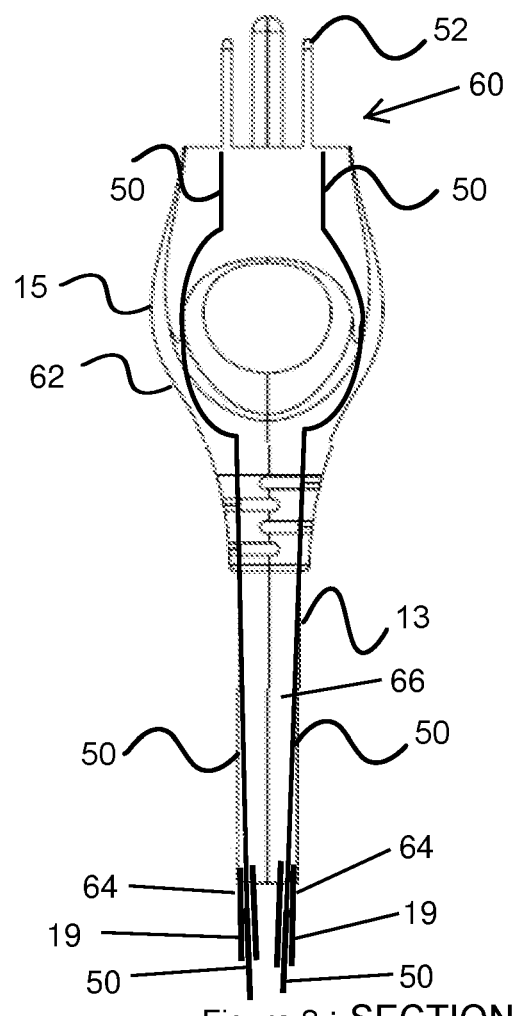
Figure 8 : SECTION A-A

SOUS VIDE APPLIANCE

CROSS-REFERENCE TO RELATED APPLICATIONS

This application is a national stage application filed under 35 U.S.C. 371 claiming the benefit of and priority to international patent application no. PCT/AU2020/050642, filed Jun. 25, 2020, which also claims priority to Australian national patent application Ser. No. 20/199,02213, filed on Jun. 25, 2019, each of which are incorporated herein by reference in their entireties.

FIELD

The present invention relates to low temperature cooking appliances, and more particularly, but not exclusively to sous vide appliances.

BACKGROUND

Low temperature cooking appliances, such as sous vide appliances, provide for circulation of liquid within which a food product is being cooked. The sous vide appliance is an electrically powered appliance that heats the liquid circulated through the appliance in order to cook the food product. Typically, the sous vide appliance has an elongate housing which can be partially submerged in the liquid. The liquid is then drawn up through an inlet and circulated around a heating element before being dispensed. Sensors and control circuitry ensure accurate and consistent temperature of the dispensed liquid. Because a portion of the appliance is submersed in liquid, there is a sealed area within the housing for housing the circuitry and sensors to prevent damage from the liquid.

Sous vide appliances are sold and used around the world and can become damaged during transit.

It is an object of the present invention to overcome or ameliorate at least some of the disadvantages of the prior art, or to at least provide a useful alternative.

SUMMARY

Disclosed herein is a device including:
a housing sealingly enclosing an interior space, the housing including a screen having an internal surface subjected to air pressure in the interior space;
electronic components connected to the screen to operate the device, the components being disposed in the interior space;
a duct communicating with the interior space to provide for the movement of air from within the interior space; and
a movable valve member movable between a first position in which the valve member closes the duct, and a second position in which the valve member allows air to leave the interior space via the duct, wherein
the valve member is biased toward the first position, and movable toward the second position when a predetermined pressure differential exists between air within the interior space and air outside the interior space.

In one embodiment, the predetermined pressure differential is 50 kPa.

Preferably, the device is a cooking device. Still preferably, the cooking device is a sous vide appliance.

Preferably, the cooking device includes a spring for biasing the valve member toward the first position.

Still preferably, the spring is configured to have a stiffness corresponding to the predetermined pressure differential.

Preferably, the duct is formed by a hollow cylinder having a cap portion, wherein the cap portion includes an aperture to allow air pressure to act on the valve member.

Preferably, the valve member includes a top portion configured to sealingly engage the hollow cylinder when the valve member is in the first position.

Still preferably, the valve member includes a seal disposed on the top portion and configured to sealingly engage the hollow cylinder when the valve member is in the first position, wherein the seal includes an aperture to allow air pressure to act on the valve member.

Also disclosed herein is a device including:
a housing sealingly enclosing an interior space, the housing including a screen having an internal surface subject to air pressure in the interior space;
electronic components connected to the screen to operate the device, the components being disposed in the interior space; and
a power cord having one end terminating within the internal space and another end connectable to an external power source; wherein,
the power cord has metallic conductors, and at least one air path to vent the interior space to ambient air pressure.

Preferably, the metallic conductors are each within a polymer coating and the at least one air path is between the metallic conductor and the respective polymer coating.

Preferably, the power cord is sealingly connected to the housing.

Preferably, the polymer coatings extruded about each of the metallic conductors has poor adhesion to the metallic conductors.

Preferably, the polymer coating includes polytetrafluoroethylene (Teflon™).

Preferably, the power cord further includes an outer polymer extruded to encase a length of all the metallic conductors and the respective polymer coatings.

Preferably, one end of the power cord has a plug compatible with the external power source.

Preferably, the outer polymer is a polyvinylchloride (PVC) and the plug is an over-molding of polytetrafluoroethylene (Teflon™).

Preferably, the metallic conductors are each stranded wires.

Preferably, the device further comprises guide structures to define a cord configuration within the housing.

Preferably, the guide structures include guide surfaces for maintaining the cord configuration such that any bend radius is not less than a minimum bend radius of at least 1.5 times the cord diameter.

Preferably, the device is a cooking device.

Preferably, the device above includes a duct communicating with the interior space to provide for the movement of air from within the interior space, and a movable valve member movable between a first position in which the valve member closes the duct, and a second position in which the valve member allows air to leave the interior space via the duct, wherein the valve member is biased toward the first position, and movable toward the second position when a predetermined pressure differential exists between air within the interior space and air outside the interior space.

In a related aspect, there is disclosed herein a method of producing a device with a housing that sealingly encloses an interior space, the housing having a screen with an internal surface exposed to air pressure within the interior space, the method comprising:

installing electronic components within the interior space;
connecting the electronic components to the screen for operation of the device; and,
a power cord extending into the interior space for powering the device from an external power source; wherein,
the power chord is formed with metallic conductors, and at least one air path to vent the interior space to ambient air pressure.

Preferably, a polymer coating is extruded about each of the metallic conductors such that the at least one air path is formed between the metallic conductor and the respective polymer coating.

Preferably, the polymer coating is extruded about the metallic conductor at a temperature above ambient such that as the polymer coating cools, the at least one air path forms.

Preferably, the polymer coating includes polytetrafluoroethylene (Teflon™).

The method may preferably further comprise extruding an outer polymer to encase a length of all the metallic conductors and the respective polymer coatings.

The method may preferably further comprise over-molding a plug at one end of the encased length with a plug compatible with the external power source.

Preferably, the outer polymer is a polyvinylchloride (PVC) and the plug is polytetrafluoroethylene.

Preferably, the metallic conductors are each stranded wires.

The method may preferably further comprise, providing guide structures to define a path for the power cord within the housing.

Preferably, the path includes a curved configuration defined by guide surfaces on the guide structures such that a minimum curvature of the power cord in the curved configuration has a radius at least 1.5 times the cord diameter.

Preferably, the device is a sous vide appliance configured to heat and circulate a liquid to cook food.

BRIEF DESCRIPTION OF DRAWINGS

Preferred forms of the present invention will now be described by way of example with reference to the accompanying drawings wherein:
FIG. 7 is an end view of a power cord for the sous vide appliance of FIG. 6;
and
FIG. 8 is a section view as shown by A-A in FIG. 7.

DESCRIPTION OF EMBODIMENTS

Figure 1:
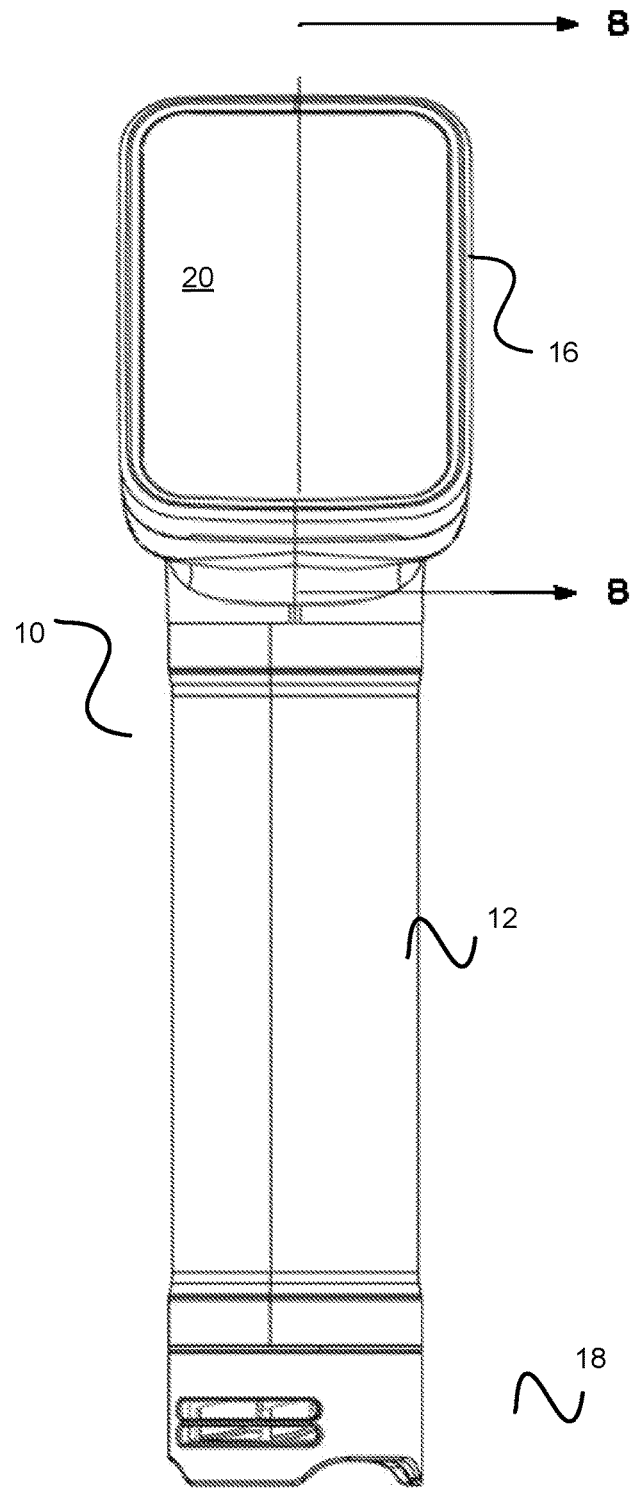
FIG. 1 is a front elevation view of a sous vide appliance.

In FIGS. 1 to 8 of the accompanying drawings there is depicted a cooking device in the form of a sous vide appliance 10. The skilled worker will understand that the figures are schematic in nature and not intended to provide an accurate depiction of all parts of the device, such as associated wiring and external insulators. The sous vide appliance 10 includes a housing 12 adapted to sealingly enclose an interior space 14. The housing 12 has longitudinally opposite ends 16, 18. At one end 16, is a user interface in the form of a screen 20. The screen 20 may be a single component or an assembly. The screen 20 has an internal surface 11 facing toward the interior space 14.

Electric power is delivered to the sous vide appliance 10 via a power cord 13 connectable to a power source (not shown). The power cord 13 includes a first end having a connecting head, or plug, 15 connectable to the power source, and a second end 17 which extends into the interior space 14 of the sous vide appliance 10 to power the electronic components 22 via metallic conductors 60. As seen in FIG. 8, the metallic connectors 60 include metal inserts 52 which form the terminals extending from the plug, and the wires 50 electrically connected to the metal inserts 52 and extending along the length of the cord 13 to the electronic components 22 within the interior space 14.

The plug 15 includes an over-molding 62 surrounding active, neutral and earth wires 50 which are connected to each respective metal insert 52. Preferably, the over-molding 62 is a polymer, and more preferably, polytetrafluoroethylene, more commonly known as Teflon™. Each of the wires 50 has a polymer coating 64 which is extruded about the wires at an elevated temperature. Preferably, the polymer coating 64 is also Teflon™ which has a poor adhesion to the surface of the wires 50 and the metal insert 52. As the Teflon coatings and over-moldings cool to ambient temperature, gaps form between the wires 50 and their respective coatings 64 to provide an air path 19 within the power cord 13. If the wires 50 and stranded wires (i.e. individual metal strands twisted together to for the wire), the Teflon™ coatings 64 more readily detach and form the air paths 19.

As best shown in FIG. 8, wires 50 and respective polymer coatings 64 are themselves encased in and outer polymer 66. The outer polymer 66 is extruded to encase the wires and polymer coatings from the plug 15, along the length of the cord 13 to the interior space 14 of the housing 12. Preferably, the outer polymer 66 is a polyvinylchloride (PVC).

In the event the devices 10 experience a significant change of ambient air pressure, such as when freighted by air, the air paths 19 will vent the interior space 14 to avoid excessive stress or damage to the screen 20. However, for the purposes of operating as a sous vide appliance, the device 10 keeps the electronic components 22 sealed from any liquid being heated and circulated to cook food.

Figure 2:
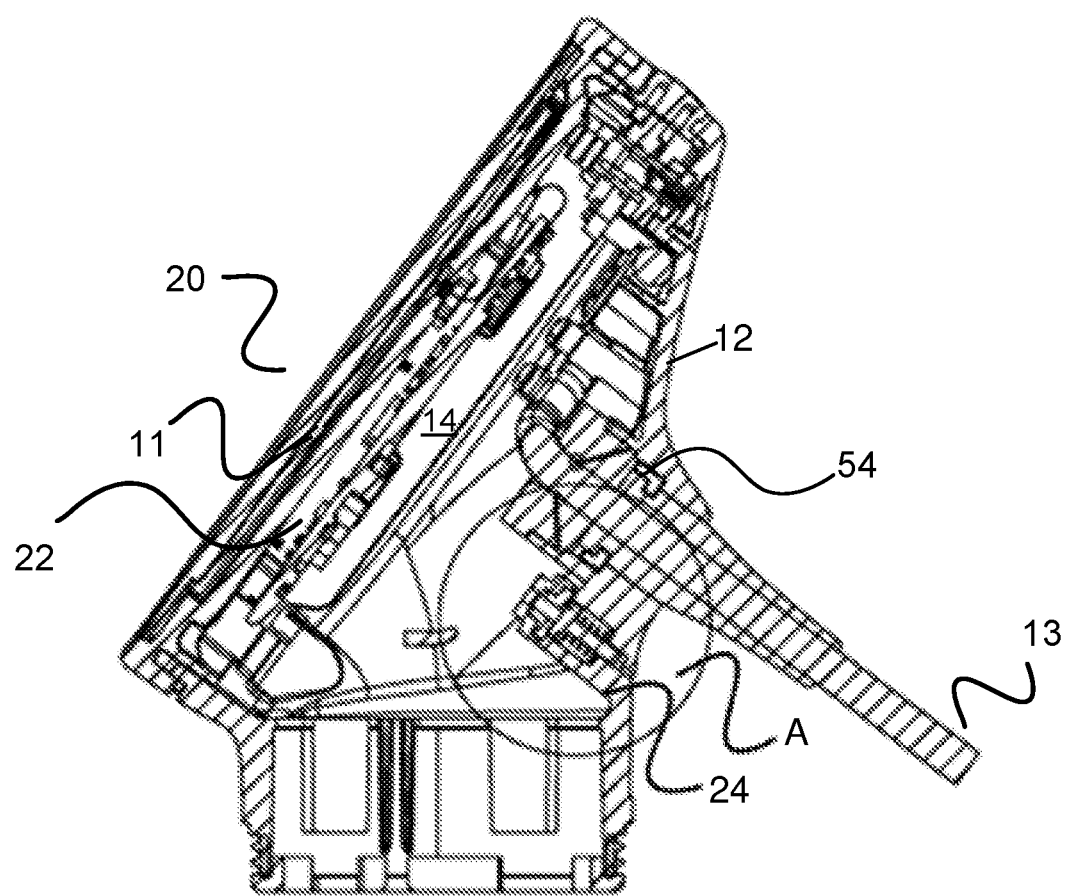
FIG. 2 is a section view of the sous vide appliance of FIG. 1 along B-B.

As best seen in FIG. 2, the power cord 13 is fixed within the interior space 14 of the sous vide appliance 10. A clamp 54 seals the connection between the power cord 13 and the housing 12. Power is delivered to electronic components 22 disposed within the interior space 14 and connected to the screen 20 to operate the sous vide appliance 10. If the power cord 13 is kinked or bent to tightly within the housing 12, there is a chance the air paths 19 will close and the interior space 14 will not equalize to ambient pressure. To guard against this, guide structures 68 (see FIG. 6) are provided in the housing 12 to hold the power cord 13 in a suitable configuration. The guide structures 68 have guide surfaces 70 to maintain a minimum cord curvature (i.e. the curve of the radially inner-most part of the cord extending around a bend) of at least 1.5 times the outer diameter of the power cord 13. The guide structures 68 can conveniently (but not necessarily) hold the power cord 13 in a desired bend radius using a guide surface 70 with the same curvature. Alternatively, the guide surfaces need not be curved but still determine the curvature of the cord given a known flexibility of the cord in its longitudinal direction.

A pressure release valve may be used to regulate air pressure in the interior space 14 as a failsafe, bearing mind this entails higher production costs. A hollow cylinder 24 provides a duct extending from the interior space 14 to outside the interior space and allows air flow from the interior space 14 to assist with equalisation or regulation of pressure at different atmospheric pressure levels. The hollow cylinder 24 is positioned on a wall of the housing 12 opposite the screen 20. The longitudinal extent of the hollow cylinder 24 is generally transverse to the screen 20. A cap portion 26 is secured to the hollow cylinder 24 using threaded fasteners (not shown). The threaded fasteners pass though apertures 28 in the cap portion 26 and the hollow cylinder 24 to secure them together. As discussed below, a seal 42 is secured between the cap portion 26 and the valve member 34. In the embodiment shown, the cap portion 26 includes a top protrusion 48 to assist in locating the seal 42. The cap portion 26 also includes opposing flat side portions 30 to accommodate adjacent components. It will be understood that other shapes for the cap portion 26 may be appropriate. The cap portion 26 further includes an aperture 32 to allow air pressure to press against the movable valve member 34 (described below).

A movable valve member 34 is disposed within the hollow cylinder 24. The valve member 34 includes a stem portion 36 and a top portion 38. The top portion 38 has a generally circular cross section transverse to the stem portion 36 and a lip 40 around the perimeter to aid in locating the seal 42.

Figure 3:
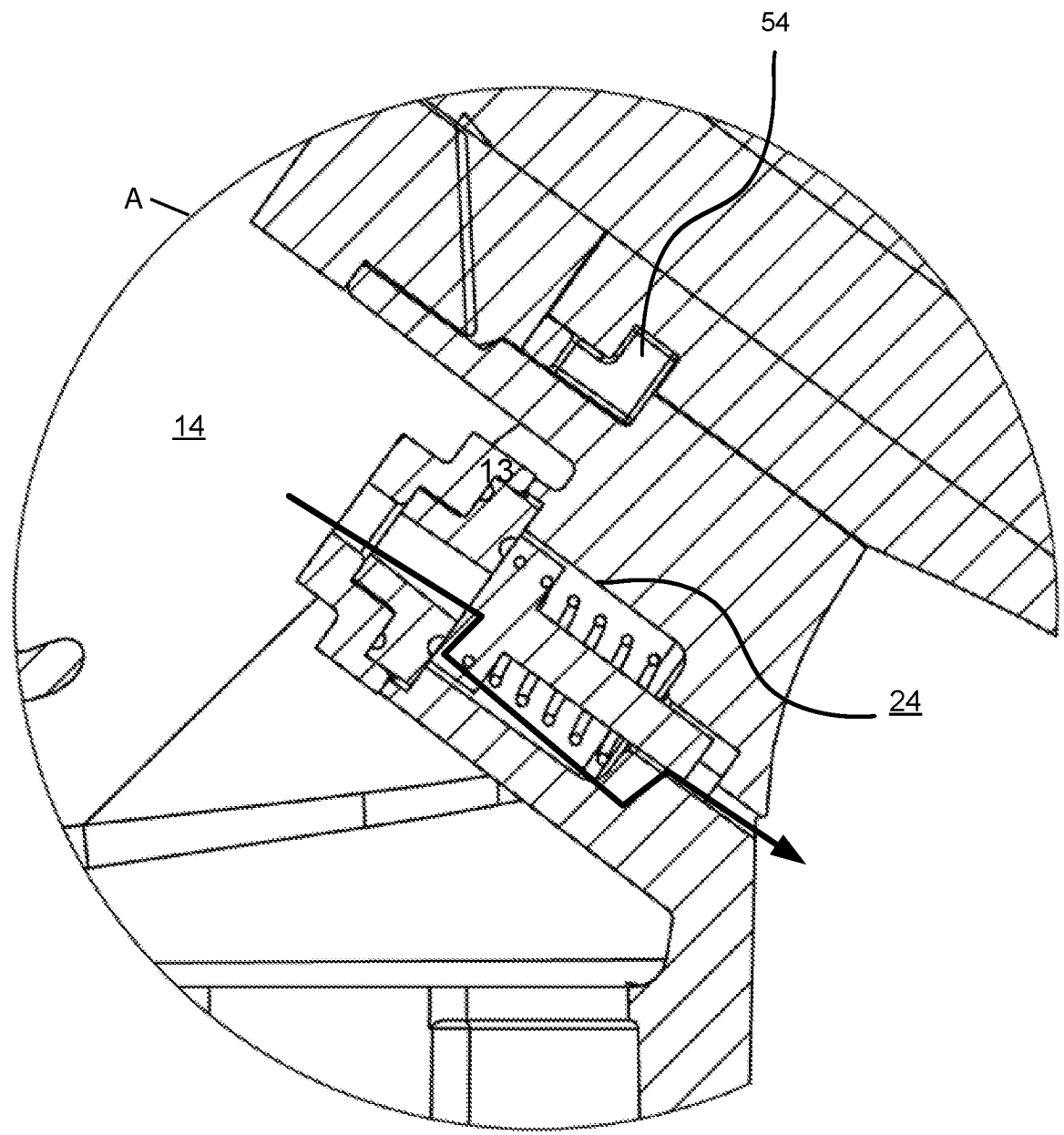
FIG. 3 is an enlarged view of inset A shown in FIG. 2.
Figure 4:
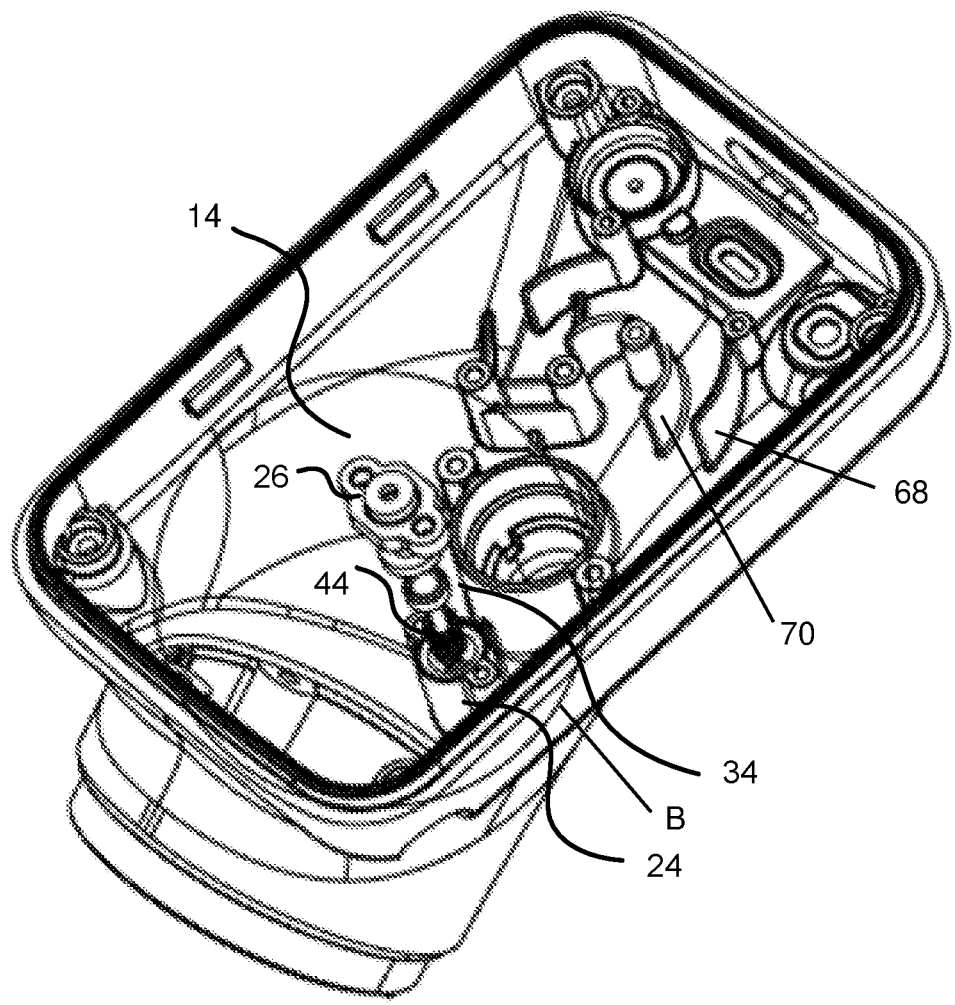
FIG. 4 is a partial plan view of the sous vide appliance of FIG. 1 with the screen removed.
Figure 5:
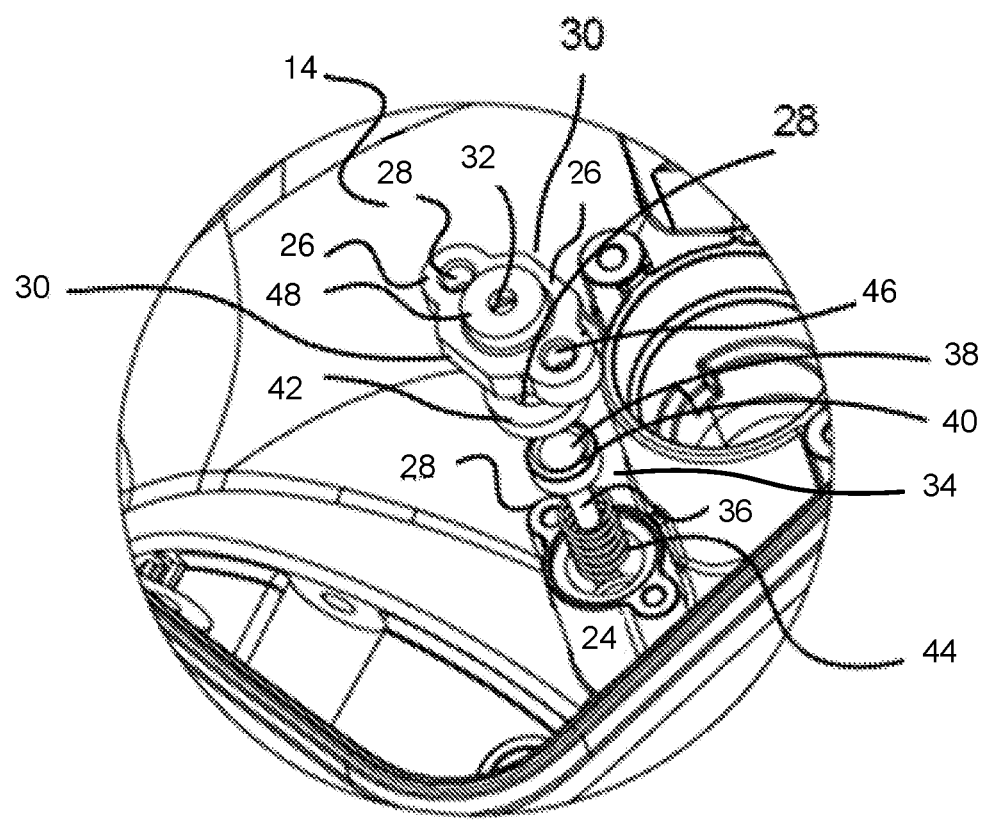
FIG. 5 is an enlarged view of inset B shown in FIG. 4.
Figure 6:
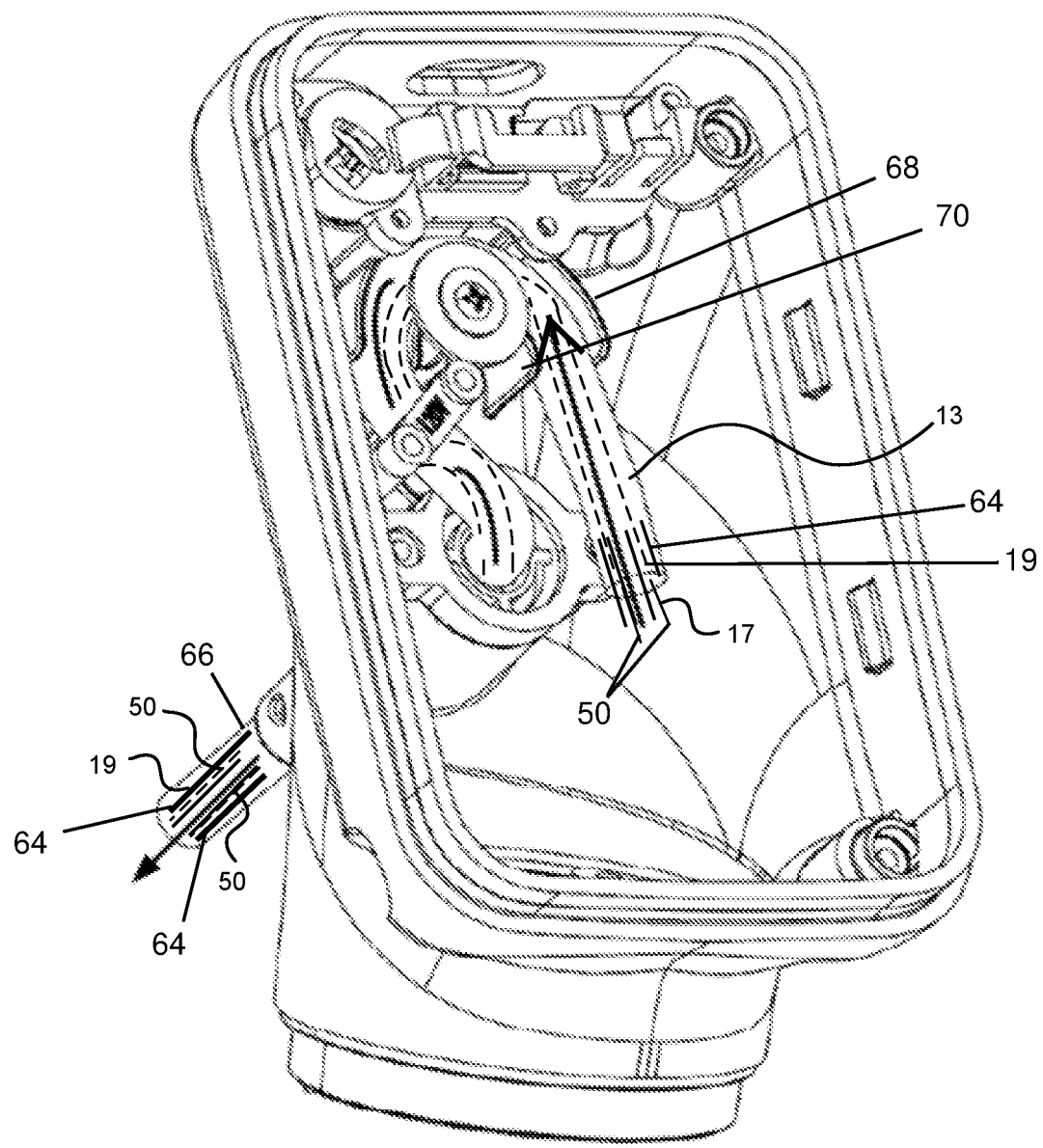
FIG. 6 is a partial view of a sous vide appliance in accordance with another embodiment of the present invention.

The valve member 34 is movable between a first position in which the valve member closes 34 the duct 24 and a second position in which the valve member 34 allows air to leave the interior space 14 via the duct 24 (see arrow in FIG. 3). This prevents any fluid ingress into the sous vide appliance 10 while ensuring the pressure difference between the interior space 14 and outside the interior space, is less than a pre-set threshold.

A helical spring 44, located within the hollow cylinder 24, is positioned in engagement with the top portion 38 of the valve member 34 so as to urge the valve member 34 toward the first, or closed, position. In use, when air pressure acts on the valve member 34 (against the spring 44) to move the valve member 34 toward the open position. Thus, the pressure differential for opening the valve member 34 can be changed by changing the stiffness of the spring 44.

In operation, when air pressure outside the sous vide appliance 10 is lower than the air pressure in the internal space 14, the air in the interior space 14 is being urged from higher pressure to lower pressure. This means that air is pressing on the moveable valve member 34 causing it to open allowing air to flow through the duct 24 (air flow is shown in FIG. 3).

The seal 42 sealingly connects the valve member 34 with the hollow cylinder 24. As described above, lip 40 around the perimeter of the top portion 38 of the valve member 34 assists in locating the seal 42 promoting better contact between the valve member 34 and the seal 42 in the closed position. The seal 42 may be made of rubber or the like, and includes an aperture 46 to allow for air pressure to press against the top portion 38 of the valve member 34.

As described above the valve member 34 may be designed to operate at different pressure differentials between inside the sous vide appliance 10 and outside the appliance. This can be controlled (in part) by modifying the stiffness of the spring 44.

For example, if the stiffness of the spring 44 is set to a threshold pressure difference between the appliance and atmosphere is 50 kPa, then the following will occur:
Appliance on GROUND
Internal @101 kPa, external @101 kPa
Purge device opens @50 kPa pressure differential
Device is RISING
Internal @101 kPa eternal @50 kPa
Purge device opens and internal pressure drops to 100 kPa (thus keeping the
50 kPa differential)
Device at 30,000 feet
Internal @100 kPa, external @ 30 kPa
Purge device opens and internal pressure drops to 30 kPa+50 kPa=80 kPa.
Device at LANDING
Internal @80 kPa, external rising back to @101 kPa
Pressure differential does not change
Device is at GROUND
Internal @ 80 kPa, external @101 kPa The valve member 34 acts as a one-way valve to outside the sous vide appliance 10. In other words, air pressure inside the appliance 10 may be far lower than atmospheric pressure at sea level, and this is not a problem because the appliance 10 can operate at 80 kPa (as shown above). Furthermore, the appliance 10 will build more internal air pressure during operations from the heat it is creating.

Although the invention has been described with reference to a specific example, it will be appreciated by those skilled in the art that the invention may be embodied in other forms.

The invention claimed is:
1. A device including:
a housing sealingly enclosing an interior space, the housing including a screen having an internal surface subject to air pressure in the interior space;
electronic components connected to the screen to operate the device, the electronic components being disposed in the interior space; and
a power cord having one end terminating within the internal space and another end connectable to an external power source; wherein,
the power cord has metallic conductors, and at least one air path to vent the interior space to ambient air pressure,
wherein the metallic conductors are each within a polymer coating and the at least one air path is between the metallic conductor and the respective polymer coating.
2. A device according to claim 1, wherein the power cord is sealingly connected to the housing.
3. A device according to claim 1,
wherein the polymer coating includes polytetrafluoroethylene (Teflon™).
4. A device according to claim 1, wherein the power cord further includes an outer polymer extruded to encase a length of all the metallic conductors and the respective polymer coatings.
5. A device according to claim 4, wherein one end of the power cord has a plug compatible with the external power source.
6. A device according to claim 5, wherein the outer polymer is a polyvinylchloride (PVC) and the plug is an over-molding of polytetrafluoroethylene (Teflon™).
7. A device according to claim 1, wherein the metallic conductors are each stranded wires.
8. A device according to claim 1, further comprising guide structures to define a cord configuration within the housing.

9. A device according to claim 8 wherein the guide structures include guide surfaces for maintaining the cord configuration such that any bend radius is not less than a minimum bend radius of at least 1.5 times the cord diameter.

10. A device according to claim 1, wherein the device is a cooking device.

11. A method of producing a device with a housing that sealingly encloses an interior space, the housing having a screen with an internal surface exposed to air pressure within the interior space, the method comprising:
    installing electronic components within the interior space;
    connecting the electronic components to the screen for operation of the device; and,
    a power cord extending into the interior space for powering the device from an external power source; wherein,
    the power cord is formed with metallic conductors, and at least one air path to vent the interior space to ambient air pressure,
    wherein a polymer coating is extruded about each of the metallic conductors such that the at least one air path is formed between the metallic conductor and the respective polymer coating.

12. A method according to claim 11, wherein the polymer coating is extruded about the metallic conductor at a temperature above ambient such that as the polymer coating cools, the at least one air path forms, and/or
    wherein the polymer coating includes polytetrafluoroethylene (Teflon™).

13. A method according to claim 11, further comprising extruding an outer polymer to encase a length of all the metallic conductors and the respective polymer coatings.

14. A method according to claim 13, further comprising, over-molding a plug at one end of the encased length with a plug compatible with the external power source.

15. A method according to claim 14 wherein the outer polymer is a polyvinylchloride (PVC) and the plug is polytetrafluoroethylene.

16. A method according to claim 11, wherein the metallic conductors are each stranded wires, and/or
    wherein the device is a sous vide appliance configured to heat and circulate a liquid to cook food.

17. A method according to claim 11, further comprising, providing guide structures to define a path for the power cord within the housing.

18. A method according to claim 17, wherein the path includes a curved configuration defined by guide surfaces on the guide structures such that a minimum curvature of the power cord in the curved configuration has a radius at least 1.5 times the cord diameter.

* * * * *